United States Patent [19]

Cerulli

[11] Patent Number: 5,438,606
[45] Date of Patent: Aug. 1, 1995

[54] OPEN POWER LOOP DETECTOR FOR TRANSMISSION LINE ELEMENTS

[75] Inventor: Guy C. Cerulli, Bolingbrook, Ill.

[73] Assignee: Teltrend Inc., St. Charles, Ill.

[21] Appl. No.: 55,531

[22] Filed: Apr. 30, 1993

[51] Int. Cl.$^6$ .................. H04M 1/24; H04M 3/22
[52] U.S. Cl. .................................. 379/24; 379/1; 379/26; 379/27; 379/28; 379/30
[58] Field of Search .............. 379/1, 4, 24, 26–28, 379/30

[56] References Cited

U.S. PATENT DOCUMENTS

| | | | |
|---|---|---|---|
| 4,926,458 | 5/1990 | Reger et al. | 379/27 |
| 4,937,851 | 6/1990 | Lynch | 379/27 |
| 5,003,573 | 3/1991 | Agah et al. | 379/27 |

OTHER PUBLICATIONS

Intel—"8-Bit Embedded Controllers" Handbook and U.S. and Canada Literature Order Form—1991.
Intel—"Advance Information" brochure—Oct. 1989—pp. 8-139 to 8-151.
Oki—"Data Book for Microcontroller"—Jun., 1990 (Fifth Ed.).
Philips—"Data Handbook for 80C51-Based 8-Bit Microcontrollers"—Feb., 1992.
Signetics—"Microcontroller Products"—Product Specification—Feb. 5, 1992—pp. 541–559.
National—"Telecommunications Databook"—1992 Edition—pp. i–iii, 1-17-87, 1-128-144.
Ericsson—Booklet "PBL 3798 Subscriber Line Interface Circuit"—Sep., 1989.

Primary Examiner—Stephen Chin
Assistant Examiner—Vijay Shankar
Attorney, Agent, or Firm—Banner & Allegretti, Ltd.

[57] ABSTRACT

An open power loop detector for digital transmission line elements using a pulsed, direct current test. The element detects when a fault in transmission lines has been corrected and the element should move from a loop powered mode back to a normal through powered mode. The detector includes a voltage regulator, voltage booster, current detector, and controller. The controller periodically activates the voltage booster to increase the direct current load between the transmit and receive cable pairs of the transmission lines. The current detector then senses whether a current is flowing between the center tap leads of the transmit cable pair. If no current is detected, indicating that the downstream transmission line still has a discontinuity, the controller waits a predetermined period of time before again activating the voltage booster and performing another test. When the current detector detects current during such a test, indicating that the cable incontinuity has been repaired, the controller moves the element to a through powered mode of operation.

5 Claims, 3 Drawing Sheets

OPEN POWER LOOP DETECTOR FOR TRANSMISSION LINE ELEMENTS

BACKGROUND OF THE INVENTION

The present invention relates generally to testing systems for digital transmission lines used in telecommunication systems and, more particularly, to a testing system for an element interconnected to digital telecommunications transmission lines that determines whether or not there is continuity in the downstream transmission line spans. Many digital telecommunications transmission facilities include a central office which may transmit data signals over transmission lines to customer premises and channel service units. Typically, the signals are sent over the transmission lines differentially on two conductors, known as the Tip-Ring Pair.

The Bell telephone system in the United States, for example, has a widely utilized Digital "D" multiplexing pulse code modulation systems. A "D" channel bank, for example, commonly provides multiple DS-1 signals that are carried on a T-1 transmission system. One pair of cables is provided for each direction of transmission.

For clarification and simplification of terminology, the pair of cables carrying signals from the central office to the customer premises equipment is designated as a "transmit" line, and the pair of cables transmitting data from the customer premises equipment and channel service unit to the central office is designated as a "receive" line. This designation is made for convenience only; of course, when an observer changes ;position from a central office to the customer premises, what used to be a "transmit" line becomes a "receive" line, and the "receive" line becomes a "transmit" line.

A variety of transmission line elements are interconnected to the transmission cables between the central office and the customer premises. For example, the signals sent by the central office to the customer premises (and vice versa) must regularly be regenerated by units called repeaters. Such regenerative repeaters are spaced along the transmission lines every 5,000 to 6,000 feet. A span may therefore be considered to consist of two pairs of cables between two system elements, such as repeaters, or between a repeater and a network interface unit.

The first repeater receives the data from the central office, but, because of transmission line losses, jitter, noise, interference, and distortion, the signal will have degraded. The repeater recognizes the presence or absence of a pulse at a particular point in time and, if appropriate, regenerates a relatively clean, new pulse. The regenerative repeater (or "line repeater" or "repeater") is powered through the transmission cable itself.

The power to operate the repeaters is provided by the central office using the simplex method. Accordingly, in the central office, a substantially constant-current source feeds the lines, and the current is typically returned, or "looped," at the customer premises equipment. Thus, direct current flows from the central office to the customer premises down the "transmit" spans, loops back at or near the customer premises, and returns back to the central office via the "receive" lines.

Repeaters are typically configured for "through powering." In such a case, a load, such as, for example, a zener diode, is used in a repeater in a "series" position. The load is in series with (1) the transmit span between the central office and the repeater ("upstream transmit span") and (2) the transmit span between the repeater and the customer premises ("downstream transmit span"). Occasionally, however, a break occurs in a span between repeaters. This may be due, for example, to a construction crew cutting a cable while digging or to a tree limb falling across the transmission line cables and breaking them. When this occurs, the through powered line elements necessarily lose power.

The telephone company, of course, wishes to be able to determine the location of the cable break before dispatching a crew to find and repair the break. Some repeaters (or other circuit elements) allow telephone operating companies to locate cable breaks (or "segment the break" to a particular span between two circuit elements such as repeaters). In such a case, the repeaters fall back to "loop powering" when a cable break occurs in a downstream span of cable. Instead of being in series with the transmit spans, the repeater load is switched between the upstream transmit and receive spans. Accordingly, the circuit elements between the break and the central office remain powered.

The repeaters may then be interrogated by test equipment (in the central office or elsewhere), via digital maintenance codes, to determine which repeaters are still receiving power. If, for example, the fourth repeater from the central office responds to interrogations and indicates that it is still receiving power, but the fifth circuit element does not respond at all (indicating that it is not receiving power), a tester in the central office may then determine that a break in the transmission lines occurred between the fourth and fifth repeaters.

After the repair in the transmission lines has been repaired, however, each of the line elements that have moved to a loop powered mode of operation should eventually return to a through powered mode of operation. Thus, repeaters should be able to independently investigate whether or not the cable break has been repaired and, thus, whether or not they should return to a through powered mode from a loop power mode.

Many presently existing methods used by line elements to determine whether the downstream transmission lines have been repaired, however, often involve adding an additional load (such as a "super zener diode") to the load that the repeater already has between the receive and transmit spans. This may accordingly involve wasting power and generating heat.

In the field, up to twelve repeaters may be held in a single case. Further, repeaters are often outside, and thus, must be able to operate in environmental conditions reaching up to 60° centigrade or more. If a cable is cut and all repeaters in the apparatus move into a loop powered mode of operation, rather than a through powered mode of operation, the added loads may result in a significant temperature rise within the repeater, especially where many of the repeaters are physically grouped together and where the repeaters are positioned outside during the summer. In such a case, the reliability of the repeaters may be adversely affected.

SUMMARY OF THE INVENTION

In a principal aspect, the present invention relates to an open power loop detector for elements within a digital transmission line system. The system includes first and second transmit spans as well as first and second receive spans that are interconnected to the line element. The line dement includes a center tap lead for both transmit spans and a center tap lead for both said receive spans.

The detector includes a voltage regulator, voltage booster, current detector, switch and controller. The voltage regulator produces a voltage drop between the center tap leads for the transmit span when the element is in a through powered mode. The voltage regulator further produces a voltage drop between the center leads for the receive spans and one of the center leads for the transmit spans when the line element is in a loop powered mode. The switch moves the line element between through powered and loop powered modes.

The controller periodically activates the voltage booster to increase the direct current load between the transmit and receive cable pairs of the transmission lines. The current detector then senses whether a current is flowing between the center tap leads of the transmit cable pair.

If substantial current is detected by the controller, the controller may then activate the switch to place the line element in a through powered mode. Otherwise, the circuit element remains in a loop powered mode. The controller may then periodically repeat the cycle of testing for current between the center tap leads of the transmit spans.

Thus, an object of the present invention is an improved open power loop detector for elements within a digital transmission line system. Yet another object is an improved open power loop detector that generates less heat and wastes less power. Yet a further object is a open power loop detector that is more reliable in elevated temperatures. Still a further object is an open loop power detector that is more reliable generally and more economical to manufacture. These and other objects, features, and advantages of the present invention are discussed or are apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
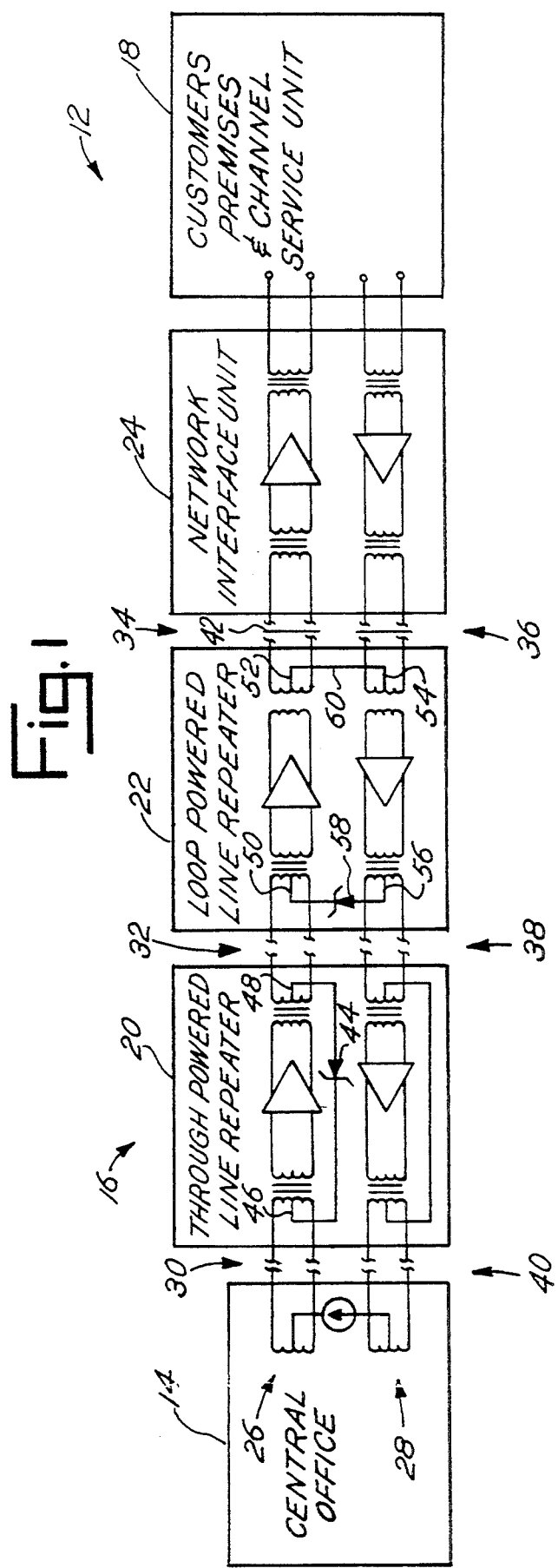
FIG. 1 is a block diagram showing a digital transmission line system in which one line repeater is in a through powered mode and another line repeater is in a loop powered mode.
Figure 2:
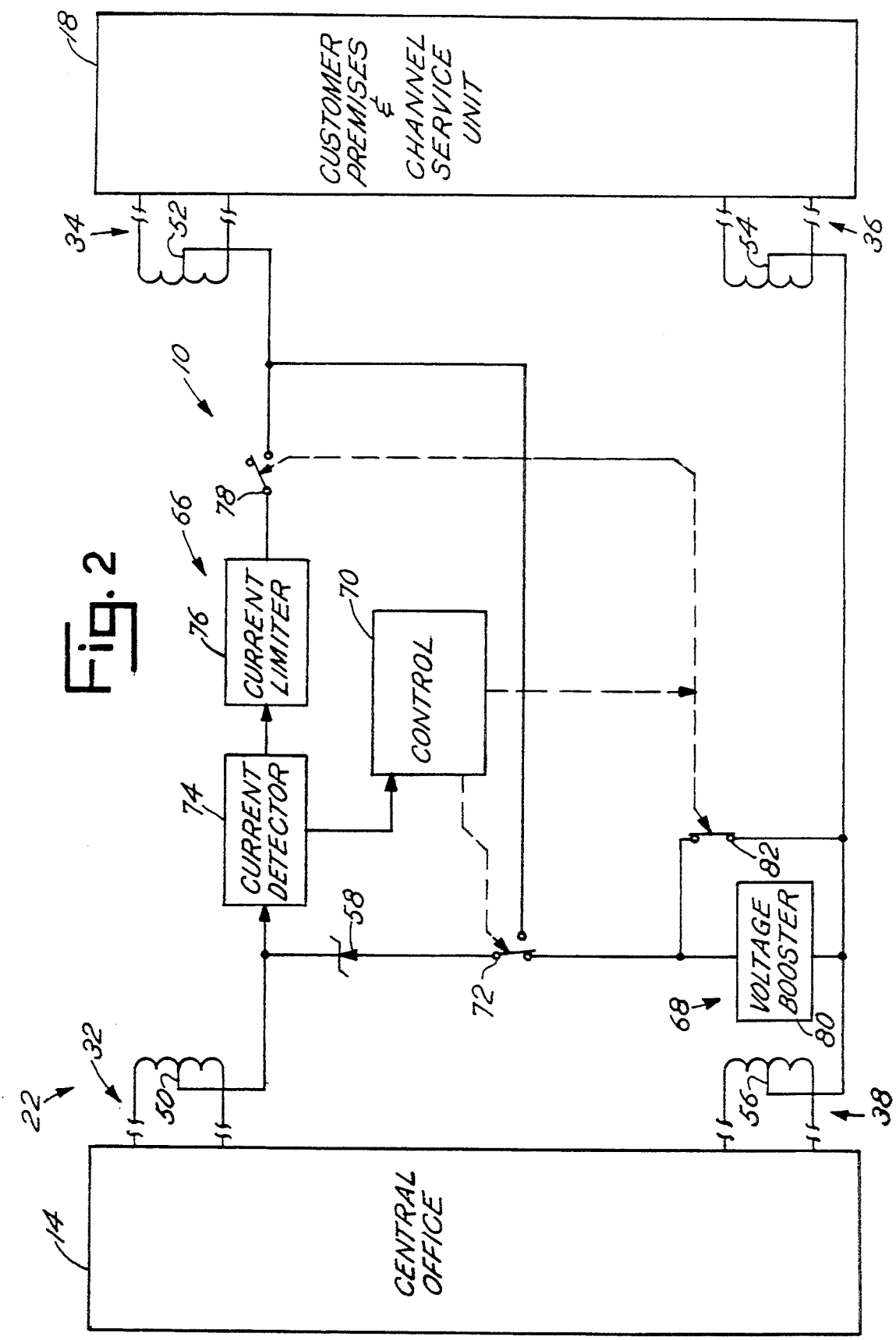
FIG. 2 is a block diagram of a preferred embodiment of the present invention, which may be used in the digital transmission line system shown in FIG. 1.
Figure 3:
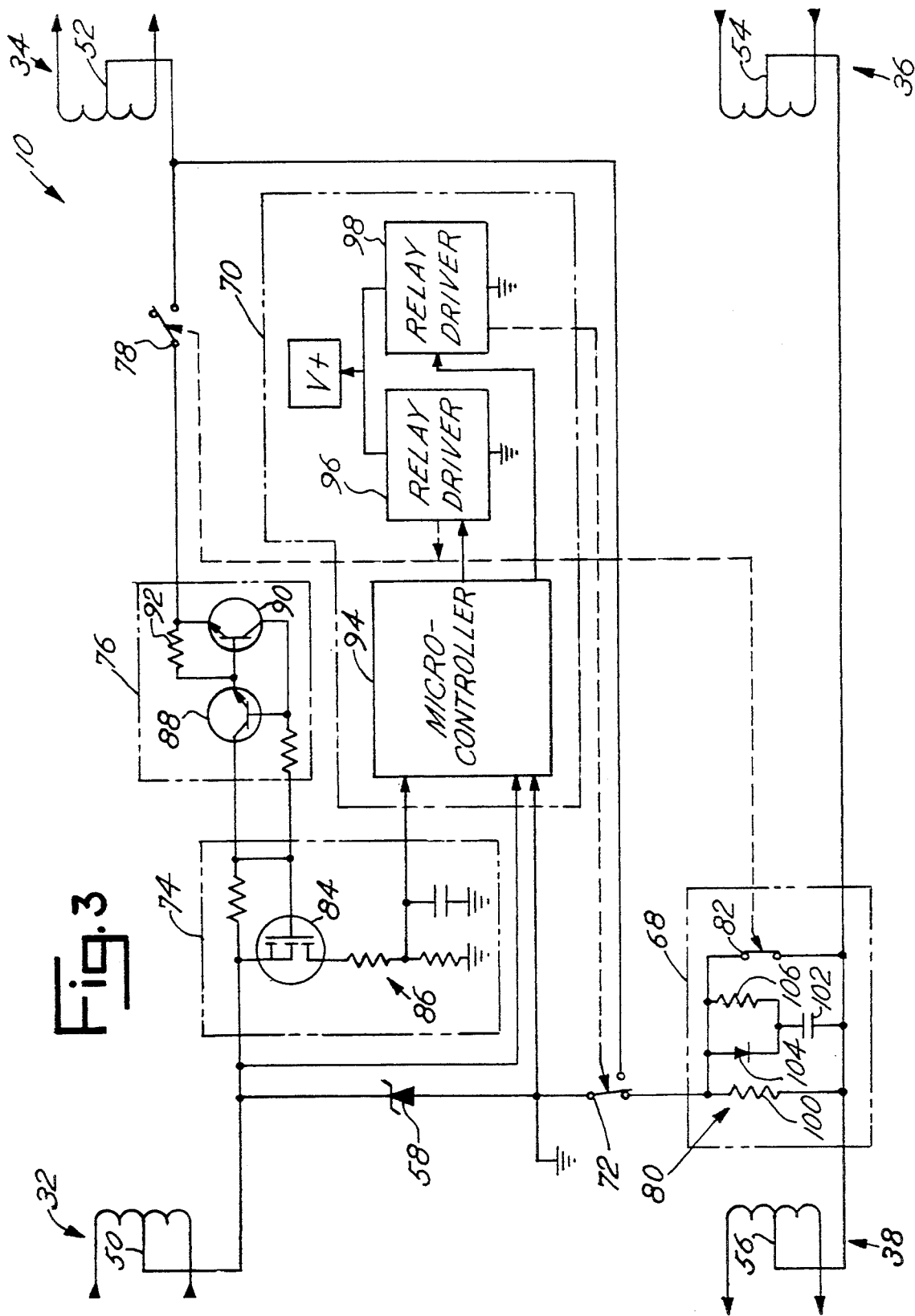
FIG. 3 is a more detailed circuit diagram of the preferred embodiment shown in FIG. 2.

Referring to FIGS. 1-3, a preferred embodiment of the present invention is shown as an open loop power detector 10 for digital telecommunication transmission facilities 12. As shown in FIG. 1, the telecommunication transmission facilities include a central office 14, a series of line elements 16, and a customer premises and channel service unit 18. The line elements are shown in FIG. 1 as an exemplary line repeater 20 in a through powered mode, a line repeater 22 in a loop powered mode, and a network interface unit 24.

The cables, or lines, are shown as two pairs of cables where, for illustrative purposes, a first pair 26 is shown as a transmit line and a second pair 28 is shown as a receive line. The designations of transmit and receive lines are, of course, arbitrary and used only for purposes of convenience and illustration. A transmit line becomes a receive line if the observer merely changes his or her position.

The transmit and receive lines 26, 28 are each broken into segments designated as spans. As shown in FIG. 1, the transmit line 26 includes first, second, and third spans, 30, 32, 34, and the receive line 28 also includes first, second, and third spans 36, 38, 40. A break 42 in the third span 34 of the transmit line 26 is also shown in FIG. 1.

The repeater 20 is shown in a through power mode, where a zener diode 44 is interconnected between two transmit line center taps 46, 48 in order to generate a voltage from which the line repeater 20 may operate. The line repeater 22 is shown in a loop powered mode of operation. The line repeater includes first and second transmit center tap leads 50, 52 as well as first and second receive center tap leads 54, 56. A zener diode 58 is placed between the first receive center tap lead 58 and the second receive center tap lead 56. Furthermore, a loop back conductor 60 is placed between the second transmit center tap lead 52 and the first receive center tap lead 54.

As shown in FIG. 2, the detector 10 is in a line element, such the repeater 22. The repeater 22 includes zener diode 58, which operates as a voltage regulator to power the line repeater 22, current detection circuit 66, a voltage boost circuit 68 and a control 70, and a primary switch 72. The current detection circuit 66 includes both a current detector 74, current limiter 76 and second switch, or relay, 78. The voltage boost circuit 68 includes both a voltage booster 80 as well as a third switch, or relay, 82.

In operation, the control 70 senses that a break has occurred in the downstream transmission lines. The term "downstream" refer to those segments of the transmission lines 26, 28 which occur between the repeater 22 and the customer premises and channel service unit 18. In such a case, the control 70 activates the primary switch 72, to place the switch 72 in the position shown in FIG. 2, and, thus, move the repeater 22 from a through powered mode (with the zener diode 58 interconnected between the first and second transmit center tap leads 50, 52) to a loop power mode, with the zener diode 58 interconnected between the first transmit center tap lead 50 and the second receive center tap lead 56.

In such a condition, the third switch 82 effectively "short circuits" the voltage booster 80 such that substantially no current flows through the voltage booster 80 and no heat is generated by the voltage booster 80. (The voltage booster 80 may include, for example, a "super diode," such that, when the switch 82 opens a further voltage, or "I-R, drop occurs in series with the zener diode 58). In the preferred embodiment, the second and third switches 78, 82 are solid state relays. The primary switch 72, in the preferred embodiment, is an electromechanical relay. All are activated by the control 70.

Periodically, the control 70 activates the second and third switches 78, 82 such that the third switch 82 moves to an open condition, placing the voltage booster 80 in the circuit. The second switch 78 also closes, placing the current detector 74 and current limiter 76 between the transmit center tap leads 50, 52. The current detector 74 then sends a current detection signal to the control 70. The current detector 74 may provide a low voltage signal, indicating that substantially no current is flowing between the transmit center tap leads 50, 52 and thus indicating to the control 70 that the discontinuity in the downstream lines 34, 36 continues. Alternatively, the current detector 74 may provide a high voltage signal to the control 70 indicating that the discontinuity has been corrected. In such a case, the control 70 then activates the primary switch 72 such that the zener diode 58 is again placed between the transmit center tap leads 50, 52. The second and third switches 78, 82 resume their normal positions shown in FIG. 2.

If a low current signal is provided to the control, however, the control 70 then returns the second and third switches 78, 82 to their normal condition, as shown in FIG. 2, and leaves the primary switch 72 in the position shown in FIG. 2. The zener diode 58 continues to be interconnected between the first transmit center tap lead 50 and the second receive center tap lead 52. The control 70 then periodically places the voltage booster 80 in series with the zener diode 58 and performs the current test. In the preferred embodiment, the voltage booster 80 is placed in the circuit only for approximately one second. If no substantial current is detected, the voltage booster 80 and current detector are taken out of the circuit for nine seconds. Another one-second test is then performed.

In operation, when the third switch 82, closes, the voltage booster 80 is effectively taken out of the circuit for approximately nine seconds, before the third switch 80 again closes for a second. Accordingly, the voltage booster 80 supplies an additional I-R drop only approximate 10% of the time. Thus, the voltage booster operates with a 10% duty cycle. Accordingly, lower heat is generated by the voltage booster 80 than would otherwise be generated if the voltage booster 80 were left in the circuit all of the time. The applicant has noted that a substantially shorter duty cycle, of, for example, than 5%, may not give the current detection circuit 66 adequate time to function. A duty cycle of more than, for example, 20%, may leave the voltage booster 80 in the circuit longer than necessarily, increasing the heat generated by the repeater 22.

The current limiter 76 limits the amount of current that may flow through the current detector 74 and between the transmit center tap leads 50, 52. Accordingly, once the default in the downstream transmission lines 34, 36 has been corrected, the detector 74 will note the correction within ten seconds after the fault has been corrected.

The customer premises and channel services unit 18, which normally provides a loop back of the DC signal from the transmit line 26 to the receive line 28 may itself cause a voltage drop of 24 to 48 volts. Thus, the voltage booster 80 must be used. If the test by the current detector 74 is performed without a voltage booster 80, current will "follow the path of least resistance," substantially flowing through the zener diode 58 and closed third switch 82, even if the downstream transmission lines 34, 36 have been corrected.

As shown in FIG. 3, the current detector 74 includes a standard-design current sensing circuit using a field effect transistor 84 and a voltage divider network 86. A 47 microfarad capacitor is also employed to provide some degree of 60 cycle noise immunity for the control 70.

The current limiter 76 includes two N-P-N transistors 88, 90 interconnected as shown. A resistor 92 interconnected to the transistor 90 generally has no more than 0.7 volt across it, thus limiting the current that may flow between the center tap leads 50, 52 of the transmit line 26.

The control 70 includes a microcontroller 94. In the preferred embodiment, the microcontroller 94 is an eight-bit MC68HC705 Motorola microprocessor. The microcontroller 94 is interconnected to first and second relay drivers 96, 98. The first relay driver 96 substantially simultaneously activates the second and third switches 78, 82. The second relay driver 98 activates the primary switch 72, which moves the; repeater 22 between through power and loop power modes of operation. The voltage booster 80 includes a resistor 100 to increase the I-R Drop in series with the zener diode 58. The voltage booster also includes a ten microfarad capacitor 102 series with a diode 104 and resistor 106 to reduce voltage spikes and reduce wear on the third switch 82.

A preferred embodiment of the present inventions has been described herein. It is to be understood, of course, that changes and modifications may be made in the preferred embodiment without departing from the true scope and spirit of the present invention, as defined by the appended claims.

I claim:

1. An open power loop detector for an element within a digital transmission line system, said system including first and second transmit spans and first and second receive spans interconnected to said element, said element including a first center tap lead for said first transmit span and a second center tap lead for said second transmit span and including a third center tap lead for said first receive span and a fourth center tap lead for said second receive span comprising, in combination:

a first switch for moving said element between a through powered and a loop powered mode;

a voltage regulator for producing a first voltage drop between said first and second center tap leads for said transmit spans, when said element is in a through powered mode, and for producing a second voltage drop between one of said first and second center tap leads for said transmit spans and one of said third and fourth center tap leads for said receive spans, when said element is in said loop powered mode;

a current detector for detecting current between said third and fourth center tap leads of said first and second receive spans upon receiving a current sense activation signal and responsively providing a current detection signal, said current detection signal comprising a low voltage signal when substantially no current is detected and a high voltage signal when substantial current is detected;

a voltage boost circuit for producing a third voltage drop between one of said first and second center tap leads for said transmit spans and one of said third and fourth center tap leads for said receive spans, upon receiving a voltage activation signal; and a controller, interconnected to said first switch, for detecting that said element is in said loop powered mode and periodically performing a cycle of providing said current sense activation signal to said current detector and providing said voltage activation signal to said voltage boost means, and receiving said current detection signal; said controller activating said first switch to move said element from said loop powered mode to said through powered mode upon receiving said high current signal and said controller maintaining said element in said loop powered mode upon receiving said low current signal.

2. A detector as claimed in claim 1 wherein said controller periodically repeats said cycle upon receiving said low current signal and wherein said controller generates said voltage activation signal to define a duty cycle of between 5% and 20%.

3. A detector as claimed in claim 1 wherein said current detector comprises a second switch in series with a current sensing circuit, said second switch receiving said current sense activation signal and responsively moving said current sensing circuit into a conducting path between said first and second center tap leads of said first and second transmit spans.

4. A detector as claimed in claim 3 wherein said current detector further comprises a current limiter in series with said current sensing circuit.

5. A detector as claimed in claim 3 wherein said voltage boost circuit comprises a third switch in a parallel with a load, said third switch receiving said voltage activation signal and responsively moving to an open condition.

* * * * *